Figure 1:
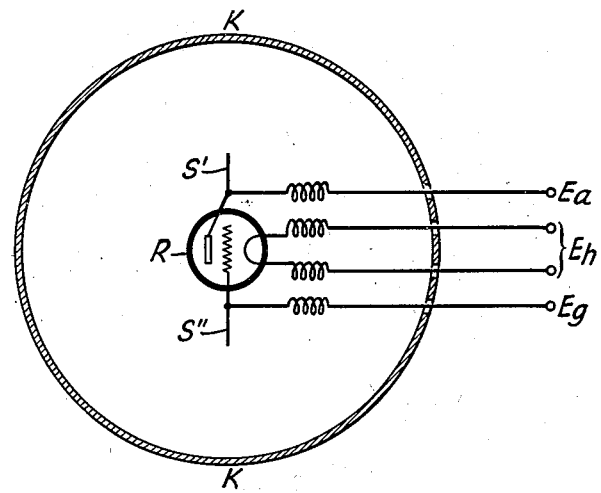

June 17, 1941.  H. E. HOLLMANN  2,245,669
OSCILLATION GENERATOR
Filed Dec. 17, 1938

INVENTOR.
HANS ERICH HOLLMANN
BY
ATTORNEY.

Patented June 17, 1941

2,245,669

UNITED STATES PATENT OFFICE 2,245,669

OSCILLATION GENERATOR

Hans Erich Hollmann, Berlin, Germany, assignor to Telefunken Gesellschaft für Drahtlose Telegraphie m. b. H., Berlin, Germany, a corporation of Germany Application December 17, 1938, Serial No. 246,439
In Germany December 29, 1937

4 Claims. (Cl. 250—36)

The invention is concerned with an arrangement adapted to produce undamped electrical oscillations, especially for a short wavelength. The generators which have heretofore been employed as a general rule, fundamentally speaking, work in this manner that either a certain resonance system, which may consist of a quasi-stationary oscillation circuit as well as of a system comprising distributed inductance and capacitance (that is, resonance lines) or finally of an electromagnetic oscillator such as a piezoelectric crystal, is excited by means of negative resistance; or else they operate in such a way that inside a suitable discharge tube space-charge accumulations are caused to reciprocate or revolve and govern the ensuing frequency and replace, as it were, the resonance structures before referred to. In many cases, these modes of exciting oscillations change over from one form into the other, the frequency of the reciprocating or revolving space-charge accumulation to be in agreement with the natural frequency of exterior oscillatory systems or else to bear a definite relationship thereto.

Contradistinct to these various arrangements and schemes known in the earlier art, the present invention entirely abandons an oscillation system conceivable as such, as before outlined. In fact, it uses instead a so-called space-charge radiation of a very definite character, which, by the aid of suitable radiation structures or by self-radiation of the tube electrodes are coupled in the tube organization in such a way that excitation of oscillations is possible, either because the inner resistance of the tube is inherently negative, so that it furnishes oscillatory energy by ways and means well known in the prior art, or else because the inherently positive inner resistance of the electron stream is changed into the negative by way of the regeneration or feed-back channel through space radiation. In other words, the space radiation surrounding the tube or propagating or expanding about the electron flow has become the sole element or factor governing the frequency and regulating the excitation of the oscillations. In order that this space radiation may have a damping as low as possible and may have an exactly defined or definite natural frequency, the tube is surrounded with a wall which is closed all around or with other reflecting surfaces, with the result that the waves reflected therefrom are caused to return to the tube or to the radiation structures associated therewith wholly or at least in major part with like phase. As will be noted, standing space waves are set up about the tube or about its radiation structure, and they represent the only existing oscillation system of the generator according to the invention. In other words, it is only by virtue of the envelope or sheath surrounding it that the tube assumes the nature of an oscillation or wave generator; in fact, without the same it is unable to generate any oscillations whatever. In order that the oscillation energy may be taken from the resonance space in case of necessity, a receiving antenna may be mounted at a suitable place inside the hollow space or cavity designed to conduct the oscillatory energy picked up by it to the outside for whatever uses this energy may be put. However, another scheme would be to permit direct and free exit to part of the space radiation through an opening formed in the shell or sheath surrounding the tube at a suitable place.

Basically, it is known in the prior art that the conditions of excitation of a short-wave feed-back transmitter or a retarding-field (electron-oscillation) or magnetron tube and the like, as well as of corresponding receiver arrangements, may be improved by the aid of a resonance space and to stabilize the frequency thereof. However, in all of these arrangements known in the earlier art, the space radiation acts only in a way promoting and favoring the excitation of oscillations upon a generator which is already, inherently, oscillatable either by virtue of the fact that this transmitter, without the ambient resonance cavity, was equipped with oscillatable, exciting and feed-back circuits, or else that it produces self-oscillations by virtue of electron oscillations or electron rotations. In all arrangements of this nature, the radiation inside the space surrounding the generator, as it were, plays the part of a secondary or tertiary circuit, whereas in the arrangement of the invention it forms directly the primary circuit; that is to say, the circuit directly excited by the stream of electrons. In the arrangement here disclosed, therefore, only the self-oscillations or the natural oscillations of the resonance space are from the outset possible.

Figure 2:
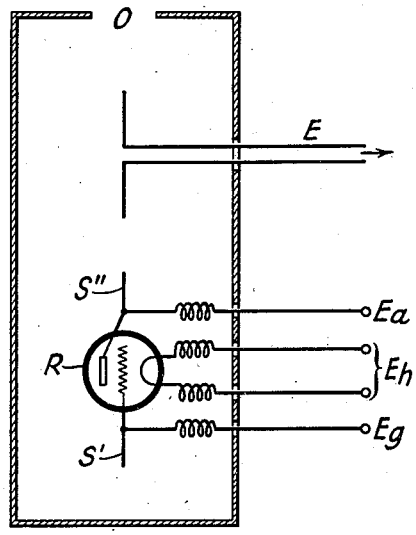
Figure 3:
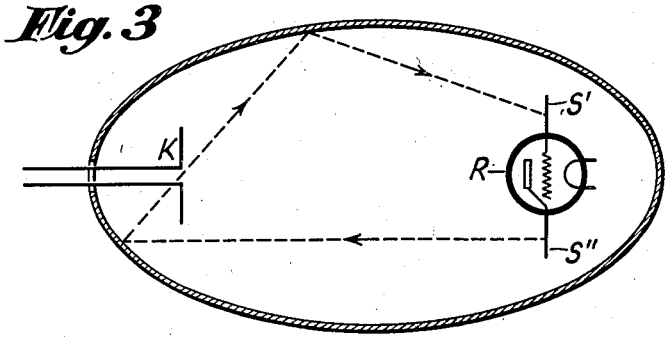

For a clearer explanation of the principle underlying the invention, reference will be had to the accompanying drawing, wherein Figs. 1, 2 and 3 represent a few practical embodiments which shall hereinafter be described in more detail.

The simplest instance of cavity resonance consists of a sphere in the center of which the tube is mounted. Referring to Fig. 1, R denotes the tube, the electrodes of which are fed by way of choke-loaded leads or lines; K denotes the hollow metallic ball or sphere surrounding the cavity body. In order to intensify the coupling between the tube and the cavity, the grid and the anode are furnished with short radiation wires S' and S''. This tube arrangement inherently is not yet an organization adapted to excite oscillations; in other words, self-oscillating of the tube by means of feed-back is not feasible without the sphere surrounding it, that is to say, when no electron oscillations inside the tube are set up. Examining the arrangement in a state where oscillations are under way, it will be seen that waves are issued from the tiny anode wire S' which are reflected from the walls of the sphere, and some of these will fall upon the small grid wire S''. These reflected waves, as will be noticed, furnish the grid control potential, and they constitute the real feed-back channel which regulates the excitation. It will be understood that the feed-back must present the proper phase relation; in other words, only very definite wavelengths may be excited, to be more precise, wavelengths having nodal points at the walls of the sphere, while the tube itself must be placed in an antinode or loop of the oscillation.

The mechanism and operation of this cavity generator may be conceived in the simplest way by assuming that the antenna wires S' and S'', by the agency of the standing waves surrounding them on all sides, result in a closed, quasi-stationary circuit, and this is an ordinary three-point (Hartley) circuit organization. Under certain circumstances, the small coupling wires may be wholly or partly dispensed with; that is, if an adequately close or strong coupling relation has already been established by the very electrodes, or when the electrodes of the tube themselves possess sufficient radiation resistance, and this may be taken to be particularly true of the anode, while the grid, which is mostly located in the interior of the hollow cylinder, is conveniently furnished with a coupling wire.

If longer waves are to be generated in this manner without being compelled to resort to unduly large spheres or cavities, then the interior of the sphere may be filled with a low-loss (lossless) dielectric of a high dielectric constant such as ceramic insulators, the dielectric constant of which may run up to 100 so that the wavelength in comparison with the dielectric constant being unity; that is, air filling of the sphere, would be lengthened ten times.

Other forms which may also find practical application consist of cylinders in the axis of which the antenna wires extend. Such a space radiation type of transmitter is shown in Fig. 2 of the appended drawing. The cylinder diameters required for the production of a certain wavelength are exactly known from the theories of free oscillations in such hollow cylinders; in fact, if the metallic cylinder bounding the resonance is assumed to be a perfectly conductive wall, the quotient of the diameter and the wavelength must correspond to the first zero place of the Bessel function $J_0$. (Must correspond to the abscissa which gives the first zero value to the Bessel function $J_0$.)

In order to prevent radiations from escaping through the end surfaces or faces bounding the cylinder at both ends, it is preferable to provide metallic closures therefor. On the contrary, however, an opening O could be formed in one of these terminal discs or else the end disc could be dispensed with entirely so that the oscillation energy is radiated away from the cylinder, this occurring in a main direction which falls in the plane of the end face of the cylinder.

Another method adapted to conduct the oscillatory energy produced inside the cavity away from and out of the cylinder so as to make the same available for various purposes, would be to mount an antenna at some suitable point inside the wave-filled cavity, said antenna picking up part of the radiation and conveying it in the form of useful energy through an energy line. Such an antenna is disposed, for instance, in the axis of the cylinder shown in Fig. 2, the energy picked up by the same flowing off to the outside by way of the double wire line E.

Fig. 3 finally illustrates a particularly favorable embodiment of a cavity oscillation system in schematic form, namely, an elliptic reflector. The tube R which is again furnished with coupling wires of miniature size S' and S'' is mounted in one of the foci of the ellipse. In an arrangement of this kind, only waves can be produced which on their path, by way of the second focus of the tube, return to the tube at the proper phase. Since the entire radio frequency energy delivered by the tube is concentrated or focused in the second focus of the oscillator, it is possible to insure a particularly efficient collection of the radiation energy by means of a coupling antenna K acting upon an energy line.

Fundamentally speaking, it is immaterial so far as the described arrangements are concerned whether the tube is driven in a normal manner; that is, with a positive anode so that the excitation is allowed to proceed by virtue of radiation feed-back coupling, or whether, for instance, the grid is rendered positive so that excitation of the oscillations is effected by virtue of a drooping dynatron line of the oscillator tube or by control of current distribution, so-called.

The transmitter here disclosed may be constructed in a particularly simple way, if the frequency-governing cavity is limited directly through the glass walls of the tube, these walls being metallized or rendered otherwise reflecting so as to improve the conditions or reflection. It is evident that tubes of this kind can be operated only inside the ultra-short wave band or range, for the reason that the glass vessels would otherwise become unduly large and because the filling with a material possessing a high dielectric constant would become prohibitory.

What is claimed is:

1. In combination, an electron discharge device having input and output electrodes, separate antennae coupled to said electrodes, and means without which said device will not oscillate for causing said device to produce oscillations comprising a metallized surface of revolution surrounding said device, said surface of revolution having such dimensions and said device being so located in the interior thereof that energy radiated by that antenna connected to said output electrode is reflected by said surface and received by the other antenna connected to said input electrode in such phase as to cause the production of oscillations, and another antenna located in the interior of said surface of revolution for picking up a portion of the energy in said interior.

2. In combination, an electron discharge device having input and output electrodes, separate antennae coupled to said electrodes, and means without which said device will not oscillate for causing said device to produce oscillations comprising a hollow electrically conducting elliptical surface surrounding said device, said device being located in one of the foci of said elliptical surface, said surface having such dimensions that energy radiated by that antenna connected to said output electrode is reflected by said surface and received by the other antenna connected to said input electrode in such phase as to cause the production of oscillations, and another antenna positioned at the other focus of said elliptical surface and having a connection extending externally of said surface.

3. A system in accordance with claim 1, characterized in this that said surface is a cylinder and said electron discharge device is located substantially in the longitudinal axis of said cylinder.

4. In an electron discharge device system, an electron discharge device and means without which said device will not oscillate for causing said device to produce oscillations comprising a feed-back means in the form of a hollow electrically conducting cylindrical surface of revolution surrounding said device, said device being so located in the interior of said hollow surface and said surface having such dimensions as to produce on the electrodes of said device the necessary phase relations for the production of oscillations of a predetermined wavelength, and an energy pick-up device also located in the interior of said surface of revolution and coupled to said electron discharge device solely through space radiation for deriving energy from said system.

HANS ERICH HOLLMANN.